(12) United States Patent
Zhang et al.

(10) Patent No.: US 9,759,835 B2
(45) Date of Patent: Sep. 12, 2017

(54) INFRARED IMAGE-SPECTRUM ASSOCIATED INTELLIGENT DETECTION METHOD AND APPARATUS

(71) Applicant: HUAZHONG UNIVERSITY OF SCIENCE AND TECHNOLOGY, Wuhan, Hubei (CN)

(72) Inventors: Tianxu Zhang, Hubei (CN); Xiangyan Liu, Hubei (CN); Xiaobing Dai, Hubei (CN); Li Liu, Hubei (CN); Hongtao Yu, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/104,921

(22) PCT Filed: Feb. 10, 2015

(86) PCT No.: PCT/CN2015/072678
§ 371 (c)(1),
(2) Date: Jun. 15, 2016

(87) PCT Pub. No.: WO2016/106956
PCT Pub. Date: Jul. 7, 2016

(65) Prior Publication Data
US 2016/0371851 A1    Dec. 22, 2016

(30) Foreign Application Priority Data

Dec. 30, 2014   (CN) .......................... 2014 1 0843190

(51) Int. Cl.
*G06K 9/00*   (2006.01)
*G01V 8/10*   (2006.01)
(Continued)

(52) U.S. Cl.
CPC .................. *G01V 8/10* (2013.01); *G01J 3/45* (2013.01); *G01J 5/20* (2013.01); *G02B 13/14* (2013.01);
(Continued)

(58) Field of Classification Search
None
See application file for complete search history.

(56) References Cited

U.S. PATENT DOCUMENTS 7,119,337 B1 *   10/2006   Johnson .................... G01J 3/02
                                                       250/339.13
8,330,087 B2 *   12/2012   Domenicali .......... G01J 3/2803
                                                       250/201.1

(Continued)

FOREIGN PATENT DOCUMENTS

CN      101303291      11/2008
CN      102564589      7/2012
(Continued)

OTHER PUBLICATIONS

Z. Fang et al., "Dual-band infrared remote sensing system with combined long-wave infrared imaging and mid-wave infrared spectral analysis," Review of Scientific Instruments, vol. 84 (2013), 6 pages.
(Continued)

*Primary Examiner* — Tahmina Ansari
(74) *Attorney, Agent, or Firm* — Hamre, Schumann, Mueller & Larson, P.C.

(57) ABSTRACT

The present invention discloses an infrared image-spectrum associated intelligent detection method and apparatus, including: first searching for targets in a field of view (FOV), and performing image-spectrum associated intelligent identification sequentially on the searched targets, that is, first performing infrared image target identification on each
(Continued)

target, and if a detection identification rate is greater than a set threshold, outputting an identification result and storing target image data; otherwise, acquiring an infrared spectrum of the target, and performing target identification based on infrared spectrum features. The present invention further discloses an apparatus for performing target detection using the above method, and the apparatus mainly includes a two-dimensional scanning mirror, a multiband infrared optical module, a long-wave infrared (LWIR) imaging unit, a broadband infrared spectrum measuring unit, and a processing and control unit. The method and apparatus of the present invention are improvements and enhancements of the conventional infrared target detection method and device, and may be used for infrared image detection, infrared image-spectrum associated detection of the target and infrared spectrum collection of the target. Compared with the conventional infrared detection device, the present invention has a higher performance cost ratio, and can significantly improve the detection identification rate of the target.

7 Claims, 4 Drawing Sheets

(51) Int. Cl.
G01J 3/45 (2006.01)
G01J 5/20 (2006.01)
G02B 13/14 (2006.01)
G06F 17/30 (2006.01)

(52) U.S. Cl.
CPC .... *G06F 17/3028* (2013.01); *G06F 17/30259* (2013.01); *G06K 9/00624* (2013.01); *G06K 2009/00644* (2013.01); *G06T 2207/10004* (2013.01); *G06T 2207/10048* (2013.01)

(56) References Cited

U.S. PATENT DOCUMENTS

| | | | | |
|---|---|---|---|---|
| 9,006,659 | B2* | 4/2015 | Zhang | G01J 5/0022 |
| | | | | 250/339.14 |
| 9,286,651 | B2* | 3/2016 | Zhang | G06K 9/00986 |
| 9,518,867 | B2* | 12/2016 | Zhang | G01B 11/002 |
| 9,582,885 | B2* | 2/2017 | Zhang | G01V 9/005 |
| 9,625,611 | B2* | 4/2017 | Zhang | G01V 9/005 |
| 9,635,285 | B2* | 4/2017 | Teich | G06K 9/0051 |
| 2011/0285995 | A1* | 11/2011 | Tkaczyk | G01J 3/02 |
| | | | | 356/326 |
| 2015/0358560 | A1* | 12/2015 | Boulanger | H04N 5/332 |
| | | | | 348/164 |
| 2016/0327682 | A1* | 11/2016 | Zhang | G01J 3/453 |
| 2016/0371851 | A1* | 12/2016 | Zhang | G01J 3/45 |

FOREIGN PATENT DOCUMENTS

| | | | | |
|---|---|---|---|---|
| CN | 103776540 | | 5/2014 | |
| CN | 103777348 | | 5/2014 | |
| CN | WO 2016106956 A1 * | | 7/2016 | ............. G01J 3/45 |
| JP | 2009139352 | | 6/2009 | |

OTHER PUBLICATIONS

J. Li, "The Study of Motion Target Intelligent Recognition and Track Technology Based on Infrared Image," Dissertation, Harbin Engineering University (2012), 92 pages, including English abstract.

* cited by examiner

INFRARED IMAGE-SPECTRUM ASSOCIATED INTELLIGENT DETECTION METHOD AND APPARATUS

TECHNICAL FIELD

The present invention relates to the field of image identification and infrared detection technologies, and in particular, to an infrared image-spectrum associated intelligent detection method and apparatus.

BACKGROUND ART

All objects whose temperatures are higher than absolute zero can generate infrared radiation. The higher the temperature is, the larger the radiated energy is, and a spectrum characteristic curve of a substance is unique. Spectral data collection is a method and technology that mainly research spectral data of a collected target scene or a region of interest (ROI). The technology is widely applied in the field of remote sensing, and provides a data basis for researching spectrum characteristics of various target backgrounds and further performing classification, monitoring and target detection and identification on a scene.

Infrared image-spectrum association refers to integrating an infrared image and an infrared spectrum to perform target detection, so as to increase types of detection range targets and improve target identification capability. Therefore, research and development on related spectrum imaging devices receive much more attention around the world. Currently, common image-spectrum detection devices are mostly multispectral scanners and Fourier transform infrared imaging spectrometers. The multispectral scanner is generally mounted in an aircraft, and a scanning mirror thereof rotates, so that a received instant field of view (FOV) moves in a direction perpendicular to a flight direction, thereby implementing scanning. Because of the forward movement of the aircraft, the multispectral scanner accomplishes two-dimensional scanning, surface features and scenes are scanned point by point, and measurement is performed point by point in different bands, thereby obtaining multispectral remote sensing image information. The multispectral scanner is suitable for non-real-time detection of a static target, and is inapplicable to a moving target. The Fourier transform infrared imaging spectrometer can provide abundant two-dimensional space information and third-dimensional spectral data, that is, spectrum information may be extracted from each point for two-dimensional space imaging. In this device, image detection and spectrum detection share the same sensor, the amount of information for signal processing is very large, and high spatial resolution and high temporal resolution cannot be achieved at the same time; moreover, it is very expensive and a user cannot afford it.

In many actual applications, it is unnecessary to acquire spectrums of a static surface feature and a sky background in real time, but it is necessary to perform automatic and real-time detection identification on a moving target or a time-varying object (a local area) in a scene by using spectrum characteristics, for example, a flying aircraft, a ship on the sea, a traveling vehicle, a fire, an explosion, and the like.

An existing principled sample machine of an "image-spectrum integrated device" can implement automatic detection and spectrum identification of multiple moving objects and time-varying objects, but it has the following problems: (1) the device can merely acquire a spectrum of a medium-wave band (2 μm~5 μm), while spectrum features of normal-temperature and low-temperature targets are mainly located in the long-wave band (8 μm~14 μm), so that the device cannot perform effective detection on such targets; (2) the device measures infrared images and spectrums for targets of interest in the FOV, and also measures spectrum and performs spectrum feature identification on a target that can be effectively detected and identified by merely using an infrared image, thereby reducing the detection and identification efficiency; (3) the device uses a step-scan tracking mirror, so the tracking precision is relatively low; and (4) the device adopts an infrared window to effectively protect internal optical components; however, for use requirements of detection on a conventional target of a static platform having a good test condition, it is unnecessary to use the infrared window, so as to reduce the cost.

SUMMARY

Directed to the defects of the prior art, an objective of the present invention is to provide an infrared image-spectrum associated intelligent detection method and apparatus, so as to solve the problems that the conventional infrared image detection device cannot effectively detect a target when the spatial resolution is low and target shape information is unavailable, and that the conventional infrared image-spectrum detection device has a low identification efficiency when using image-spectrum associated detection and cannot effectively detect a normal-temperature target and a low-temperature target when the spatial resolution is high and target shape information is available.

The present invention provides an infrared image-spectrum associated intelligent detection method, which includes the following steps:

(1) acquiring an infrared image of a target scene, and performing image processing on the infrared image, to extract N targets in the scene; N being an integer greater than or equal to 1;

(2) sorting the N targets from small to large according to distances between the targets and a center of a field of view (FOV);

(3) performing shape information-based target identification on the $i^{th}$ target in the scene, and when the identification rate of the $i^{th}$ target is greater than or equal to a set threshold, performing step (4); when the identification rate of the $i^{th}$ target is less than a set threshold, performing step (5); an initial value of i being 1;

(4) i=i+1, and determining whether i is greater than N, if yes, ending the process, and if no, returning to the step (3);

(5) changing an FOV range, so that the $i^{th}$ target is overlapped with a center of an FOV of the infrared image at the current moment;

(6) splitting infrared light radiated by the $i^{th}$ target into two beams, one beam being imaged to obtain an image, and the other beam being interfered to obtain an interference pattern, which is subjected to Fourier inversion to obtain a spectrum;

(7) processing the spectrum and extracting a target spectrum feature; the target spectrum feature comprising a spectrum peak value, a peak wavelength, the number of spectrum peaks and an interval thereof, and the area of the spectrum peaks; and (8) comparing and matching the spectrum feature of the $i^{th}$ target with a spectrum feature in a preset database, and if they can match with each other, identifying the target and obtaining the image and spectrum of the target, and returning to the step (4); and if they cannot match with each other, adding the target spectrum feature to the database, and returning to the step (4).

The present invention further provides an infrared image-spectrum associated intelligent detection apparatus, including a two-dimensional scanning mirror, a multiband infrared optical module, a long-wave infrared (LWIR) imaging unit, a broadband infrared spectrum measuring unit, a processing and control unit, and a power supply module. An input end of the multiband infrared optical module is used to receive infrared incident light reflected by the two-dimensional scanning mirror, the LWIR imaging unit is connected to a first output end of the multiband infrared optical module, the broadband infrared spectrum measuring unit is connected to a second output end of the multiband infrared optical module, a spectrum input end of the processing and control unit is connected to the broadband infrared spectrum measuring unit, an image input end of the processing and control unit is connected to the LWIR imaging unit, and a control output end of the processing and control unit is connected to a control end of the two-dimensional scanning mirror; an output end of the power supply module is respectively connected to power supply ends of the broadband infrared spectrum measuring unit, the LWIR imaging unit, the multiband infrared optical module and the two-dimensional scanning mirror, for supplying power respectively.

During work, the infrared incident light is reflected by the two-dimensional scanning mirror to the multiband infrared optical module, and, after being converged, can straightly reach the LWIR imaging unit for imaging, or is split into two beams, including a long-wave infrared beam and a broadband infrared beam, which respectively reach the LWIR imaging unit for imaging and the broadband infrared spectrum measuring unit for forming a spectrum; the processing and control unit receives the image acquired by the LWIR imaging unit and the spectrum acquired by the broadband infrared spectrum measuring unit, processes the image and the spectrum, and controls movement of the two-dimensional scanning mirror, thereby implementing target tracking and identification.

Further, the two-dimensional scanning mirror includes a planar reflector and a two-dimensional servo turntable, the planar reflector is disposed on the two-dimensional servo turntable, controls the two-dimensional servo turntable to move, so as to drive the planar reflector to implement rotation in two dimensions including pitching and rotating.

Further, the multiband infrared optical module includes an infrared lens, a spectroscope, an LWIR imaging lens group, a broadband infrared spectrum forming lens group, an FPA interface, and an optical fiber interface. The spectroscope is placed to form an angle of 45 degrees with an optical axis of the infrared lens. The spectroscope is movable, and during full-field of view (FOV) scanning and image information-based target identification, the spectroscope is moved out; and when the target spectrum is acquired to perform target identification based on an image-spectrum feature database, the spectroscope is not moved out. The LWIR imaging lens group is disposed on an optical axis of a transmission optical path of the spectroscope, the broadband infrared spectrum forming lens group is disposed on an optical axis of a reflection optical path of the spectroscope, the FPA interface is disposed on an optical axis of the LWIR imaging lens group, and the FPA interface is used to be coupled to the LWIR imaging unit. The optical fiber interface is disposed on an optical axis of the broadband infrared spectrum forming lens group, and the optical fiber interface is used to be coupled to the broadband infrared spectrum measuring unit.

Further, the infrared lens is a Cassegrain multiband infrared lens.

Further, the spectroscope is coated with a semi-reflecting and semi-transmitting beam splitting film, and the spectroscope has a semi-reflecting and semi-transmitting function on infrared light having the wavelength of 8 µm~12 µm and has a reflecting function on infrared light having the wavelength of 2 µm~8 µm.

By means of the above technical solution of the present invention, compared with the prior art, different substances have different spectrum features, and in addition to image information, the method of the present invention further use the spectrum feature of the target in the target identification, thereby increasing the information dimension for identifying different targets, and being capable of improving the detection identification rate. The band range of the acquired target spectrum is extended from the short and medium wave infrared bands (2~5 µm) to the short, medium and long wave infrared bands (2~12 µm); therefore, not only a high-temperature target whose major spectrum feature is located in the short and medium wave infrared bands can be identified, but also low-temperature and normal-temperature targets whose major spectrum features are located in the long wave infrared band (8~12 µm) may also be identified, thereby increasing the range of target detection and identification. The method of the present invention merges the long-wave infrared image and the broadband infrared spectrum of the target to perform target detection and identification, is the improvement and enhancement of the existing infrared detection method and device, can solve the problems that the existing infrared detection system cannot effectively detect a target during long-distance detection with a low resolution and that the existing infrared image-spectrum detection device cannot effectively detect normal-temperature and low-temperature targets, and can also implement broadband infrared spectrum collection of the target.

DETAILED DESCRIPTION

In order that the objectives, technical solutions and advantages of the present invention become clearer and more comprehensible, the present invention is further described in detail through the accompanying drawings and embodiments.

The present invention provides an infrared image-spectrum associated intelligent detection method, implementing intelligent detection by associating an infrared image and an infrared spectrum, and including two modes: infrared image detection and image-spectrum associated detection.

In the present invention, the infrared image detection mode refers to that: after an infrared image is acquired by using a conventional infrared detection process, a region of interest (ROI) is extracted by an image processing method, and target identification is performed by using information such as shape. The infrared image-spectrum associated detection mode refers to that: a long-wave infrared image and a long-medium wave infrared spectrum are merged organically to perform target detection and identification, a target is first locked at a center of an FOV, an infrared spectrum thereof is acquired, and then, target identification based on an infrared spectrum feature is performed.

When target identification is performed by using the method of the present invention, targets in the FOV are searched first, and image-spectrum associated intelligent identification is performed sequentially on the searched targets, that is, infrared image target identification is performed on each target first, if a detection identification rate is greater than or equal to a set threshold, an identification result is output and target image data is stored; otherwise, a target infrared spectrum is acquired, and target identification based on the infrared spectrum feature is performed. If comparison and matching succeed, the identification result is output and target spectral data is stored; otherwise, the target infrared spectrum feature is added to an infrared spectrum feature database.

Figure 1:
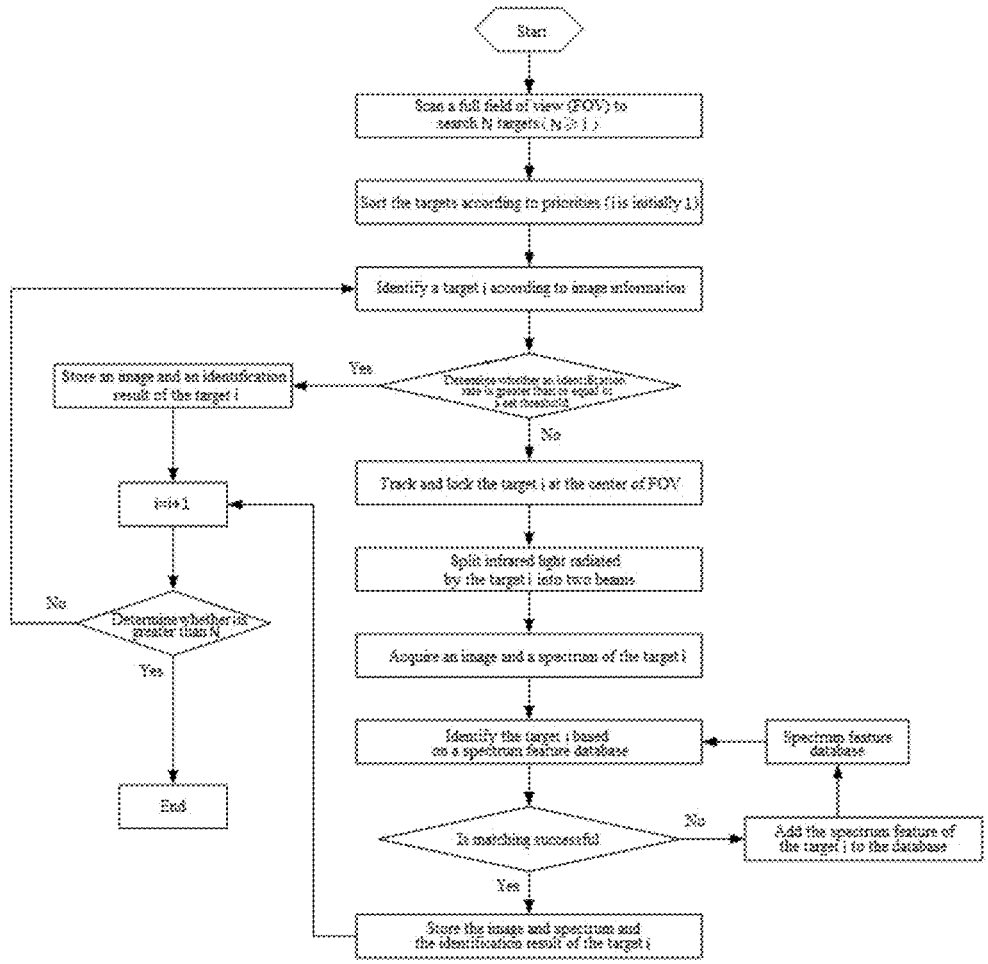
FIG. 1 is a schematic diagram of a principle of an infrared image-spectrum associated detection method.

The schematic diagram of the principle of the method of the present invention is shown in FIG. 1, which mainly includes the following steps:

(1) acquiring an infrared image of a target scene, and performing image processing on the infrared image, to extract N targets in the scene; N being an integer greater than or equal to 1;

(2) sorting the N targets from small to large according to distances between the targets and a center of an FOV;

(3) performing shape information-based target identification on the $i^{th}$ target in the scene, and when the identification rate of the $i^{th}$ target is greater than or equal to a set threshold, performing step (4); when the identification rate of the $i^{th}$ target is less than a set threshold, performing step (5); an initial value of i being 1; where, the threshold is an empirical value, which may be (85%-97%), and preferably 90%, 95%, 97%.

(4) i=i+1, and determining whether i is greater than N, if yes, ending the process, and if no, returning to the step (3);

(5) changing an FOV range, so that the $i^{th}$ target is overlapped with a center of an FOV of the infrared image at the current moment;

(6) splitting infrared light radiated by the $i^{th}$ target into two beams, one beam being imaged to obtain an image, and the other beam being interfered to obtain an interference pattern, which is subjected to Fourier inversion to obtain a spectrum;

(7) processing the spectrum and extracting a target spectrum feature; the target spectrum feature including a spectrum peak value, a peak wavelength, the number of spectrum peaks and an interval thereof, and the area of the spectrum peaks; and (8) comparing and matching the spectrum feature of the $i^{th}$ target with a spectrum feature in a preset database, and if they can match with each other, identifying the target and obtaining the image and spectrum of the target, and returning to the step (4); and if they cannot match with each other, adding the target spectrum feature to the database, and returning to the step (4).

In the present invention, the comparison and matching refers to comparing the measured spectrum with a spectrum in the database, so as to find a spectrum having the maximum similarity with the measured spectrum. The similarity of two spectrum curves may be determined by a distance solving method after normalization, and two spectrum curves having the shortest distance are considered as the most similar curves. The distance between the spectrum curves may be defined as a quadratic sum of data points or a sum of moduli. Determination may also be performed by using product energy of two normalized spectrum signals, that is, a sum of products of two normalized signals, and the two having the maximum value are considered as the most similar curves.

In the present invention, the basis of performing target identification by using the infrared image-spectrum associated detection mode is to acquire the spectrum of the target first, and the acquiring the spectrum of the target that has been searched in the FOV mainly has the following two stages: target tracking, and target locking and spectrum measurement. The target tracking refers to changing the FOV range, so that the measured target is overlapped with the center of the FOV of the infrared image at the current moment. The target locking and spectrum measurement refers to changing the FOV range, so that the center of the FOV and a pointed target move synchronously to keep still relative to each other, the measured target is locked at the center of the FOV, and the infrared incident light radiated by the acquired target is split into two parts, so as to acquire the spectrum and the image of the target.

In the present invention, if multiple targets are searched in the FOV, identification priority sorting is performed on the searched targets from small to large according to distances between the targets and the center of the FOV, so as to ensure that as many targets as possible can be identified.

Figure 2:
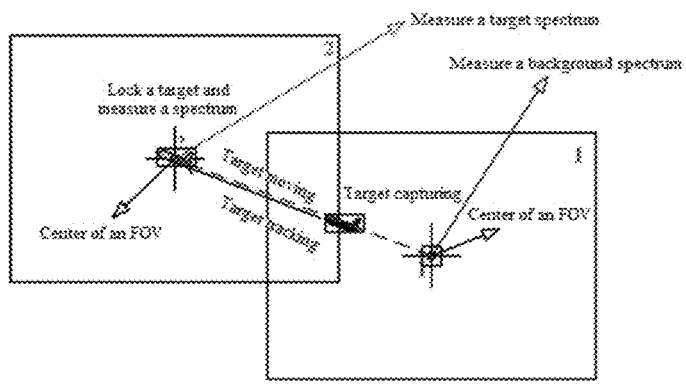
FIG. 2 is a schematic diagram of a process of acquiring a target spectrum when there is one target.
Figure 3:
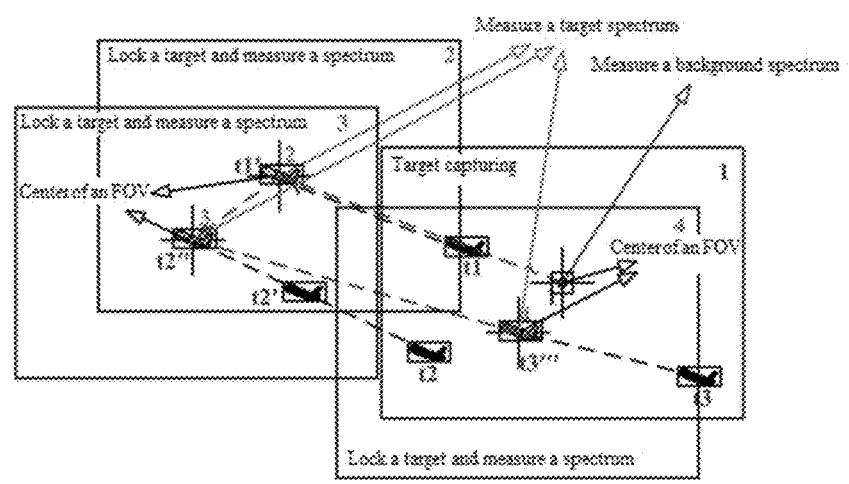
FIG. 3 is a schematic diagram of a process of acquiring target spectrums when there are multiple targets.

Schematic diagrams of processes of acquiring a target spectrum when there is one target and when there are multiple targets are shown in FIG. 2 and FIG. 3.

In FIG. 2, in an FOV 1, a moving target is searched, which is not located at a center of the FOV, a spectrum of the center of the FOV is acquired first and used as a background spectrum for spectral data processing, then the target is tracked, and in an FOV 2, the target is locked at a center of the FOV, and a spectrum of the target is acquired.

In FIG. 3, in an FOV 1, three moving targets t1, t2 and t3 are searched, which are not located at a center of the FOV, then they are sorted from small to large according to distances between the three targets and the center of the FOV, the sorted order is: t1, t2, t3, a spectrum of the center of the FOV is acquired first and used as a background spectrum for spectral data processing, then the three targets are tracked sequentially according to the order of t1, t2, t3, and spectrums of the three targets are acquired, and in FOVs 2, 3 and 4, the three targets are respectively locked at centers of the FOVs, and the spectrums of the three targets are acquired.

Figure 4:
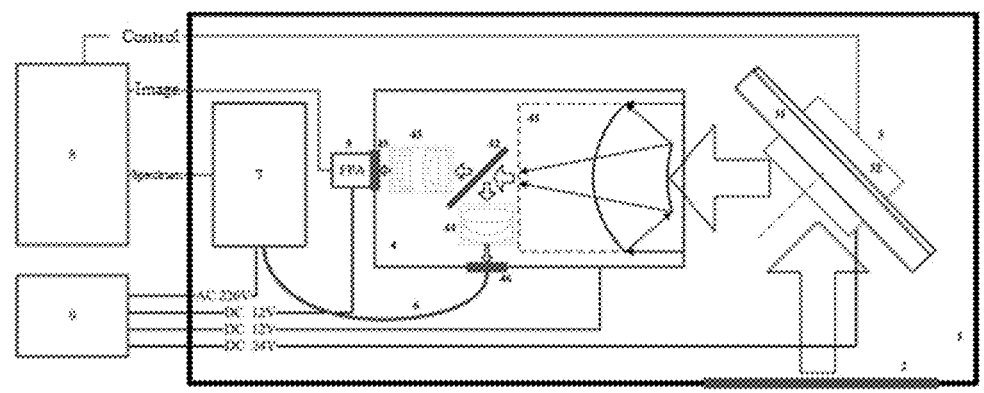
FIG. 4 is a schematic structural diagram of a smart infrared image-spectrum associated detection apparatus.

The present invention further provides a smart infrared image-spectrum associated detection apparatus, and a structure thereof is shown in FIG. 4, including a two-dimensional scanning mirror 3, a multiband infrared optical module 4, a LWIR imaging unit 5, a broadband infrared spectrum measuring unit 7, a processing and control unit 8, and a power supply module 9. After being incident into a system, infrared light is reflected by the two-dimensional scanning mirror 3 to be incident to the multiband infrared optical module 4, and, after being converged, can straightly reach the LWIR imaging unit 5 for imaging, or is split into two beams, including a long-wave infrared beam and a broadband infrared beam, which respectively reach the LWIR imaging unit 5 for imaging and the broadband infrared spectrum measuring unit 7 for forming a spectrum. The processing and control unit 8 receives the image acquired by the LWIR imaging unit 5 and the spectrum acquired by the broadband infrared spectrum measuring unit 7, processes the image and the spectrum, and controls movement of the two-dimensional scanning mirror 3, thereby implementing target tracking and identification. The power supply module 9 supplies power to the two-dimensional scanning mirror 3, the multiband infrared optical module 4, the LWIR imaging unit 5, and the broadband infrared spectrum measuring unit 7.

In the embodiment of the present invention, the two-dimensional scanning mirror 3 may be formed by a planar reflector 31 and a two-dimensional servo turntable 32, and may implement movements in two dimensions including pitching and rotating.

In the embodiment of the present invention, the multiband infrared optical module 4 may be formed by a Cassegrain multiband infrared lens 41, a spectroscope 42, an LWIR imaging lens group 43 and a broadband infrared spectrum forming lens group 44. The multiband infrared optical module 4 is provided with a Focal Plane Array (FPA) interface 45 and an optical fiber interface 46, respectively being coupled to an non-cooled LWIR imaging unit and a broadband infrared optical fiber.

Figure 5:
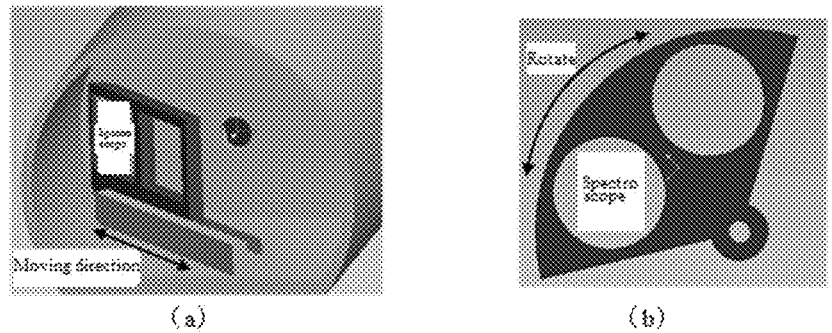
FIG. 5 is a schematic diagram of an optical path switching manner of a spectroscope, where (a) is an optical path switching manner of a movable spectroscope, and (b) is an optical path switching manner of a rotatable spectroscope.
Figure 6:
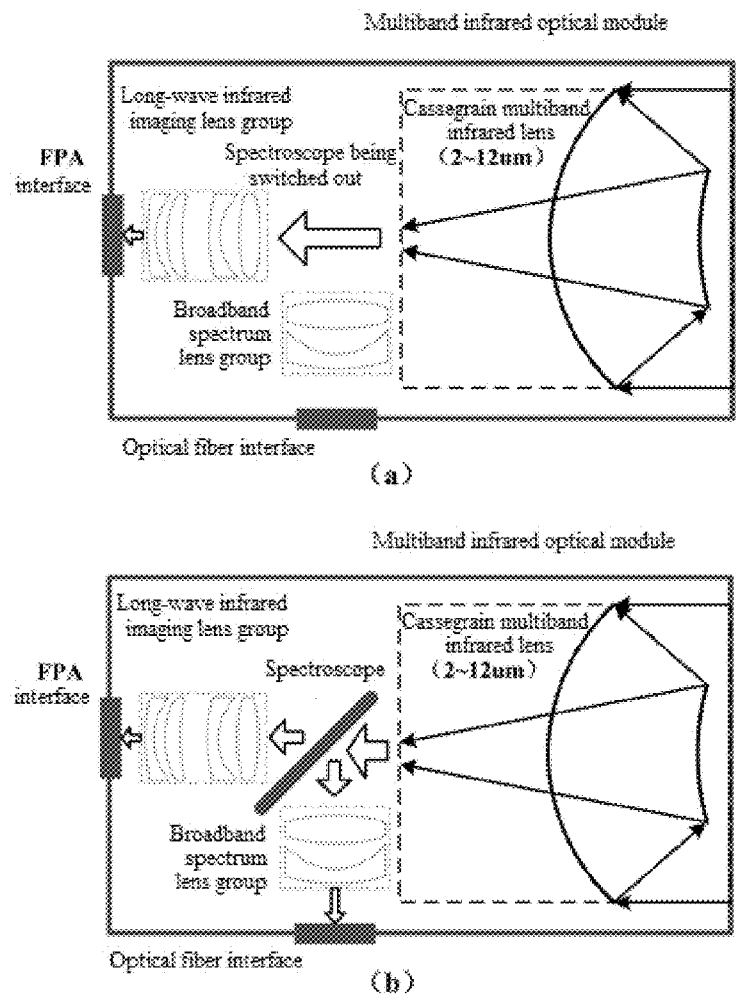
FIG. 6 is a schematic diagram of optical paths when a spectroscope is switched in and switched out, where (a) is a schematic diagram of an optical path when a spectroscope is switched in, and (b) is a schematic diagram of an optical path when a spectroscope is switched out.

The Cassegrain multiband infrared lens 41 folds the optical path, compresses the volume of an optical system, and has a desirable convergence function on short, medium and long wave infrared light. The spectroscope is coated with a special semi-reflecting and semi-transmitting beam splitting film, having a semi-reflecting and semi-transmitting function on long-wave (8 µm~12 µm) infrared light and a reflecting function on short and medium-wave (2 µm~8 µm) infrared light. A spectroscope of a conventional image-spectrum device is fixed, and in the present invention, the spectroscope is movable, and is placed to form an angle of 45° with an optical axis of the infrared light converged by the Cassegrain multiband infrared lens 41. The spectroscope has two positions, a switch-in optical path and a switch-out optical path. The moving of the spectroscope may be implemented by using a rotatable or movable mechanism, as shown in FIG. 5, where (a) is a movable structure, and (b) is a rotatable structure. Schematic diagrams of optical paths when the spectroscope is switched in and switched out are shown in FIG. 6(a) and FIG. 6(b). In FIG. 6(a), when the spectroscope is switched out of the optical path, the infrared light incident to the multiband infrared optical module is converted by the Cassegrain multiband infrared lens to totally and straightly reach the LWIR imaging unit through the FPA interface for imaging. In FIG. 6(b), when the spectroscope is switched in, the infrared light incident to the multiband infrared optical module is converged by the Cassegrain multiband infrared lens to reach the spectroscope, and is split into two beams by the spectroscope, which respectively reach the LWIR imaging unit for imaging and the broadband infrared spectrum measuring unit for forming a spectrum.

The broadband infrared spectrum measuring unit 7 may be a non-imaging Fourier transform unit detector, and is coupled to the broadband infrared spectrum forming lens group through the broadband infrared optical fiber 6. The above assembly may be enclosed in a shell 1, the shell 1 is provided with a side window at a side surface thereof, and the infrared incident light is incident into the system through the window.

Figure 7:
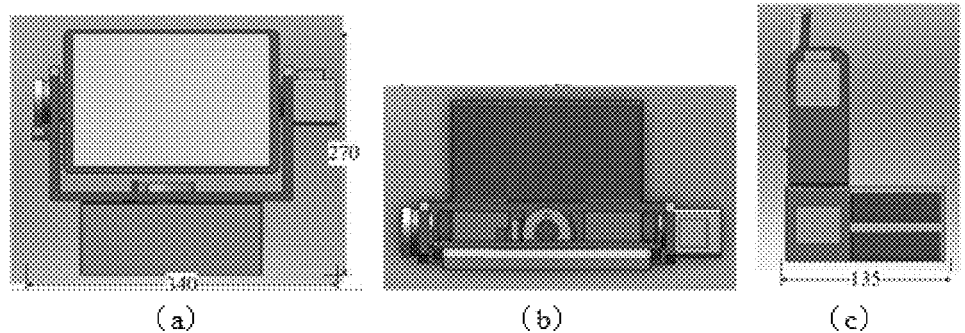
FIG. 7 is a schematic structural diagram of a two-dimensional scanning mirror, (a) is a front view, (b) is a top view, and (c) is a left view.

The two-dimensional scanning mirror 3 provided in the embodiment of the present invention is formed by a planar reflector 31 and a two-dimensional servo turntable 32, and may implement movements in two dimensions including pitching and rotating. The two-dimensional scanning mirror is supported by using a U-shaped base, rotation axes of a lens and a motor are shifted by a distance, and a deviation exists between a rotation axis of the motor and a rotation central axis of the lens. That is, a deviation exists between an angle of rotation of the motor and an angle of movement of an actually tracked object. A schematic structural diagram of the two-dimensional scanning mirror is shown in FIG. 7, where (a) is a front view, (b) is a top view, and (c) is a left view. A geometric center of the lens keeps a distance of 210 mm from a mounting surface of the base, and two shafts of the two-dimensional servo turntable are both provided with a rotation hard stop to prevent misoperations. The two-dimensional turntable drives the load lens to form two-dimensional tracking scanning in a horizontal plane and a vertical plane, where the horizontal scanning is at ±5°, the vertical scanning is at −10°~25°, the maximum scanning speed is 16°/s, and the precision of the rotation angle is 0.013°.

In this embodiment, the two-dimensional servo turntable adopts a DSP technology based Programmable Multi-Axis Controller (PMAC) as a motion control system. The PMAC uses a DSP56001/56002 digital signal processor of the Motorola Company as a central processing unit, and can control, through a flexible advanced language, 2 to 8 axes simultaneously to perform completely coordinated movement. The PMAC provides basic functions such as motion control, housekeeping, and intra-host interaction, and indexes thereof such as speed, resolution and bandwidth are far superior to a common motion controller; therefore, it completely meets control demands of the two-dimensional turntable for high precision and high response.

In this embodiment, the infrared optical fiber 6 may implement coupling of the optical fiber interface 46 on the multiband infrared optical module 4 and the broadband infrared spectrum measuring unit 7 by using a chalcogenide glass optical fiber, and may transmit infrared light of short, medium and long broadband (2 µm~12 µm). The optical fiber is flexible, and connecting by using the optical fiber makes the structure of the system more compact, and a volume thereof is smaller.

In this embodiment, the broadband infrared spectrum measuring unit 7 is used to perform interference sampling on the incident light, and acquire the broadband infrared spectrum of the target through Fourier transform. In the embodiment of the present invention, a spectrum detecting unit EM27 or a process control spectrum measuring system IRCube OEM of the Bruker Optics Company in Germany may be used, both of which adopt a michelson interferometer system, the spectrum resolution may optionally be 2 cm$^{-1}$, 4 cm$^{-1}$, 8 cm$^{-1}$, 16 cm$^{-1}$ and 32 cm$^{-1}$, the spectrum measurement range is 2 μm~12 μm, and a Stirling or liquid-nitrogen cooled MCT detector is used.

In the embodiment of the present invention, the LWIR imaging unit 5 may adopt an UL03041 non-cooled long-wave infrared detector of the ULIS Company in France, the imaging band is 8 μm~14 μm, it has a thermistor focal plane, a detection material is polycrystalline silicon, a thermal response time is 7 ms, a filling coefficient is greater than 80%, a pixel sampling frequency is 7.375 MHz, the number of failed pixels is less than 1%, the power consumption is less than 4 W, the frame frequency is 50 HZ, the resolution is 384*288, and the noise equivalent temperature difference is 60 mk.

The processing and control unit 8 may adopt a hardware system structure of FPGA+DSP+dedicated ASIC, SOC. The DSP may use a multi-core processor, and the FPGA can adopt a product of the Xilinx or Altera Company. The using of the application specific integrated circuit (ASIC) can further improve the flexibility of hardware design, reduce the volume of the module, and reduce the power consumption.

Figure 8:
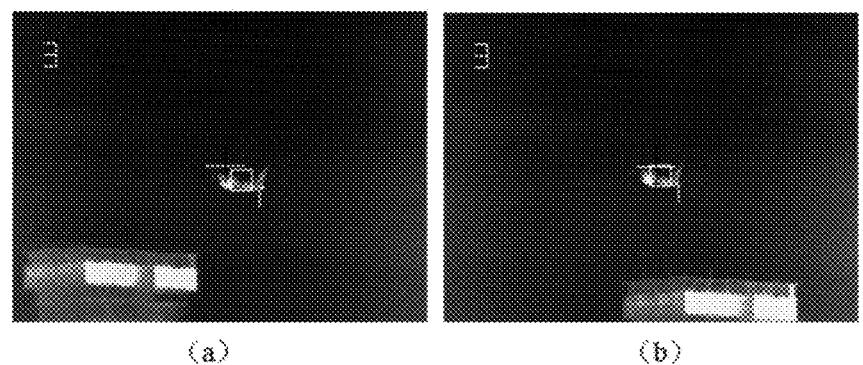
FIG. 8 is a detection example using an infrared image detection mode, where (a) and (b) are two frames of long-wave infrared image of an aircraft that just takes off.
Figure 9:
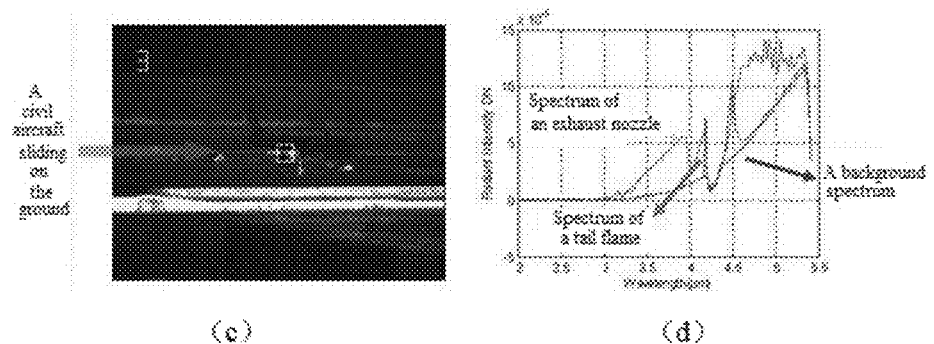
FIG. 9 is a detection example using an infrared image-spectrum associated detection mode, (a) is a long-wave infrared image of a high pressure sodium lamp of an airport, (b) is a spectrum of the high pressure sodium lamp, (c) is a long-wave infrared image of a sliding aircraft, and (d) is spectrums of the tail flame and an exhaust nozzle of the sliding aircraft.

FIG. 8 and FIG. 9 provide two detection examples. FIG. 8(a) and FIG. 8(b) are two frames of long-wave infrared image of an aircraft that just takes off. It can be identified that it is an aircraft by merely using image information, and it is unnecessary to use image-spectrum detection. FIG. 9(a) and FIG. 9(c) are long-wave infrared images of a high pressure sodium lamp of an airport and a sliding aircraft taken at night, and since they occupy few pixels in the image, the two cannot be effectively detected and distinguished merely by using image information such as shape; therefore, the image-spectrum associated detection mode is used to perform detection and identification. FIG. 9(b) and FIG. 9(d) are spectrums of the high pressure sodium lamp, and a tail flame and an exhaust nozzle of the sliding aircraft, they have similar shapes, however, the spectrums thereof are greatly different from each other, and the two can be effectively distinguished by using spectrum information. In combination with FIG. 8 and FIG. 9, it can be qualitatively analyzed that the present invention can solve the above technical problems and implement the objective of the present invention.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. An infrared image-spectrum associated intelligent detection method, comprising the following steps:
   (1) acquiring an infrared image of a target scene, and performing image processing on the infrared image, to extract N targets in the scene; N being an integer greater than or equal to 1;
   (2) sorting the N targets from small to large according to distances between the targets and a center of a field of view (FOV);
   (3) performing shape information-based target identification on the i$^{th}$ target in the scene, and when the identification rate of the i$^{th}$ target is greater than or equal to a set threshold, performing step (4); when the identification rate of the i$^{th}$ target is less than a set threshold, performing step (5); an initial value of i being 1;
   (4) i=i+1, and determining whether i is greater than N, if yes, ending the process, and if no, returning to the step (3);
   (5) changing an FOV range, so that the i$^{th}$ target is overlapped with a center of an FOV of the infrared image at the current moment;
   (6) splitting infrared light radiated by the i$^{th}$ target into two beams, one beam being imaged to obtain an image, and the other beam being interfered to obtain an interference pattern, which is subjected to Fourier inversion to obtain a spectrum;
   (7) processing the spectrum and extracting a target spectrum feature; and
   (8) comparing and matching the spectrum feature of the i$^{th}$ target with a spectrum feature in a preset database, and if they can match with each other, identifying the target and obtaining the image and spectrum of the target, and returning to the step (4); and if they cannot match with each other, adding the target spectrum feature to the database, and returning to the step (4).

2. The infrared image-spectrum associated intelligent detection method according to claim 1, wherein, the threshold in the step (3) is 85%~97%.

3. An infrared image-spectrum associated intelligent detection apparatus, comprising a two-dimensional scanning mirror (3), a multiband infrared optical module (4), a long-wave infrared (LWIR) imaging unit (5), a broadband infrared spectrum measuring unit (7), a processing and control unit (8), and a power supply module (9);
   wherein an input end of the multiband infrared optical module (4) is used to receive infrared incident light reflected by the two-dimensional scanning mirror (3), the LWIR imaging unit (5) is connected to a first output end of the multiband infrared optical module (4), the broadband infrared spectrum measuring unit (7) is connected to a second output end of the multiband infrared optical module (4), a spectrum input end of the processing and control unit (8) is connected to the broadband infrared spectrum measuring unit (7), an image input end of the processing and control unit (8) is connected to the LWIR imaging unit (5), and a control output end of the processing and control unit (8) is connected to a control end of the two-dimensional scanning mirror (3);
   an output end of the power supply module (9) is respectively connected to power supply ends of the broadband infrared spectrum measuring unit (7), the LWIR imaging unit (5), the multiband infrared optical module (4) and the two-dimensional scanning mirror (3), for supplying power respectively, the multiband infrared optical module (4) comprises an infrared lens (41), a spectroscope (42), an LWIR imaging lens group (43), a broadband infrared spectrum forming lens group (44), an FPA interface (45), and an optical fiber interface (46);
   the spectroscope (42) is placed to form an angle of 45 degrees with an optical axis of the infrared lens (41), the spectroscope (42) is movable, and during full-field of view (FOV) scanning and image information-based target identification, the spectroscope (42) is moved out; and when the target spectrum is acquired to perform target identification based on an image-spectrum feature database, the spectroscope (42) is not moved out;

the LWIR imaging lens group (43) is disposed on an optical axis of a transmission optical path of the spectroscope (42), the broadband infrared spectrum forming lens group (44) is disposed on an optical axis of a reflection optical path of the spectroscope (42), the FPA interface (45) is disposed on an optical axis of the LWIR imaging lens group (43), the FPA interface (45) is used to be coupled to the LWIR imaging unit (5); the optical fiber interface (46) is disposed on an optical axis of the broadband infrared spectrum forming lens group (44), and the optical fiber interface (46) is used to be coupled to the broadband infrared spectrum measuring unit (7).

4. The infrared image-spectrum associated intelligent detection apparatus according to claim 3, wherein, during work, the infrared incident light is reflected by the two-dimensional scanning mirror (3) to the multiband infrared optical module (4), and, after being converged, can straightly reach the LWIR imaging unit (5) for imaging, or is split into two beams, comprising a long-wave infrared beam and a broadband infrared beam, which respectively reach the LWIR imaging unit (5) for imaging and the broadband infrared spectrum measuring unit (7) for forming a spectrum; the processing and control unit (8) receives the image acquired by the LWIR imaging unit (5) and the spectrum acquired by the broadband infrared spectrum measuring unit (7), processes the image and the spectrum, and controls movement of the two-dimensional scanning mirror (3), thereby implementing target tracking and identification.

5. The infrared image-spectrum associated intelligent detection apparatus according to claim 3, wherein, the two-dimensional scanning mirror (3) comprises a planar reflector (31) and a two-dimensional servo turntable (32), the planar reflector (31) is disposed on the two-dimensional servo turntable (32), controls the two-dimensional servo turntable (32) to move, so as to drive the planar reflector (31) to implement rotation in two dimensions comprising pitching and rotating.

6. The infrared image-spectrum associated intelligent detection apparatus according to claim 3, wherein, the infrared lens (41) is a Cassegrain multiband infrared lens.

7. The infrared image-spectrum associated intelligent detection apparatus according to claim 3, wherein, the spectroscope (42) is coated with a semi-reflecting and semi-transmitting beam splitting film, and the spectroscope (42) has a semi-reflecting and semi-transmitting function on infrared light having the wavelength of 8 μm~12 μm and has a reflecting function on infrared light having the wavelength of 2 μm~8 μm.

* * * * *